March 16, 1948. J. W. ORENDORFF 2,437,890
DUMP CART
Filed Dec. 14, 1945 2 Sheets-Sheet 2

Inventor:
John W. Orendorff
By: Paul O. Pippel
Atty.

Patented Mar. 16, 1948

2,437,890

UNITED STATES PATENT OFFICE 2,437,890

DUMP CART

John W. Orendorff, Canton, Ill., assignor to International Harvester Company, a corporation of New Jersey Application December 14, 1945, Serial No. 635,007

3 Claims. (Cl. 298—22)

This invention relates to dump carts. The invention was designed primarily for use in connection with vegetable harvesters to receive the harvested crop and convey it to another location for storage or the like.

An object of the invention is to provide in a cart, adapted to be drawn by a tractive vehicle, means deriving power from the tractive vehicle for dumping the cart.

Another object of the invention is to provide in a dump cart having a pivoted gate thereon an improved mechanism for opening the gate in response to the dumping of the body of the cart.

Another object is to provide in a dump cart having a swinging gate for releasing the contents thereof an improved mechanism comprising toggle links connected to the dump body and to the gate and actuated by the movement of the body to dumping position to open the gate.

Other objects and advantages will become clear from the following detailed description when read in conjunction with the accompanying drawings, wherein.

Figure 3:
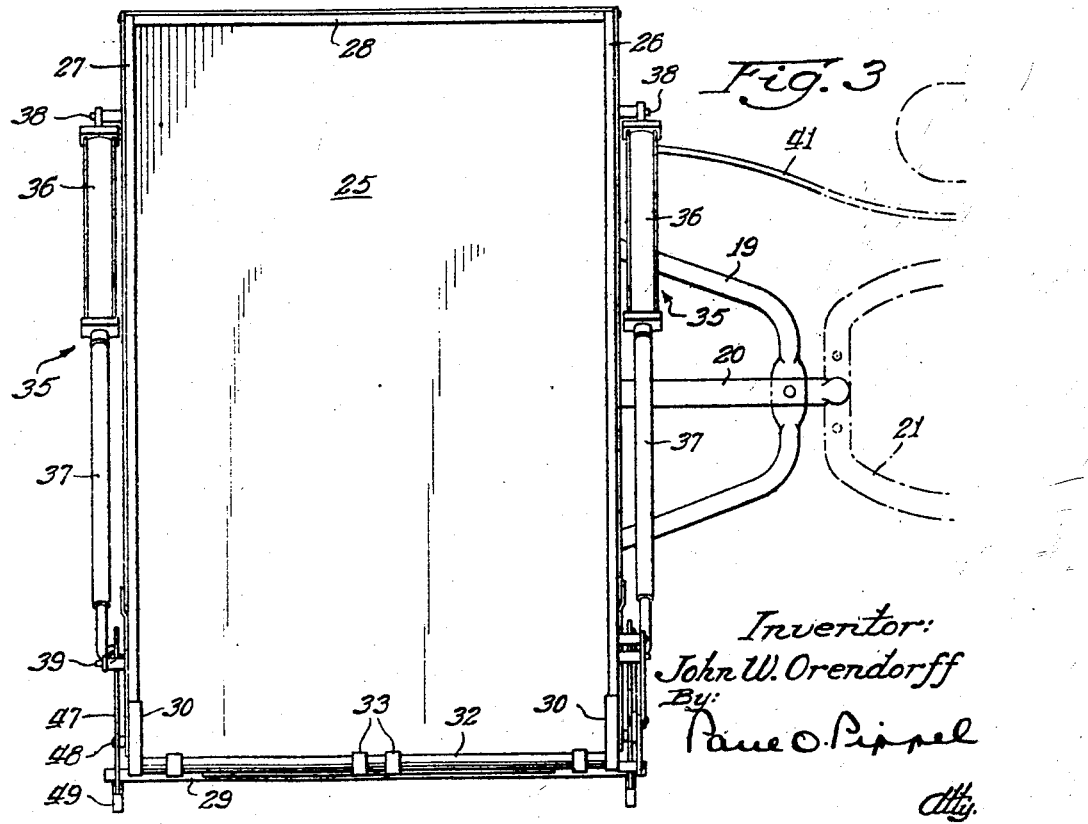
Figure 3 is a plan view thereof.

Referring to the drawings, the dump cart of the present invention comprises a rectangular frame indicated by the numeral 10 and including front and rear frame bars 11 and side frame bars 12 serving as a support for a dump body 13. Frame 10 carrying the dump body 13 is mounted by means of depending brackets 14 upon a transverse axle 15 carrying supporting wheels 16 and 17. The frame 10 carrying body 13 is further braced by straps 18, and a hitch frame 19 is provided, braced to the frame by a strap 20 and adapted for connection to the draw-bar 21 of a tractor generally indicated at 22. The hitch frame 19 is generally U-shaped, as indicated in Figure 3, and has rearwardly diverging arm portions connected to the axle 15 near opposite ends thereof.

Figure 1:
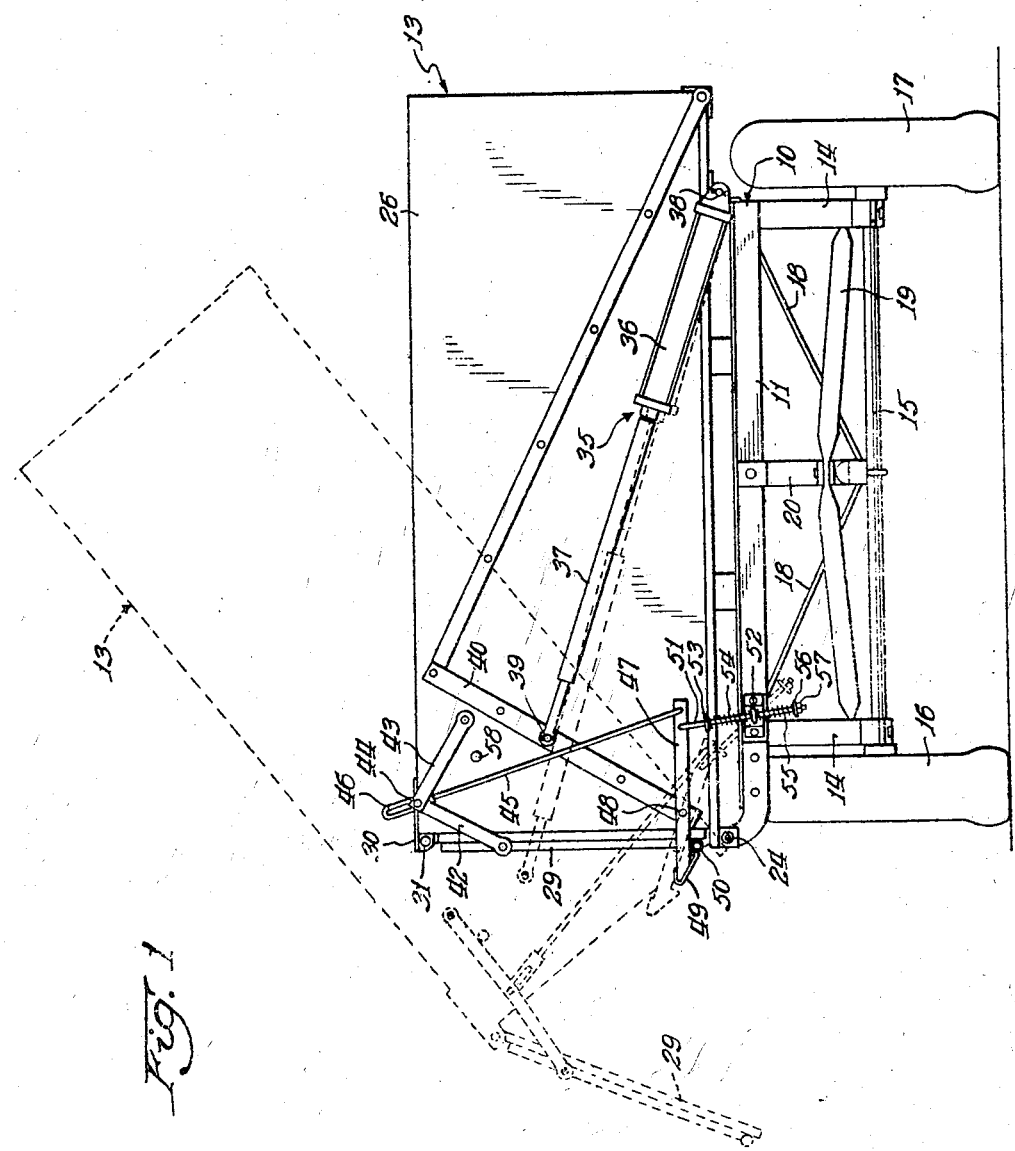
Figure 1 is a view in front elevation of a dump cart embodying the features of the present invention and showing in dotted lines the dump body in dumping position.
Figure 2:
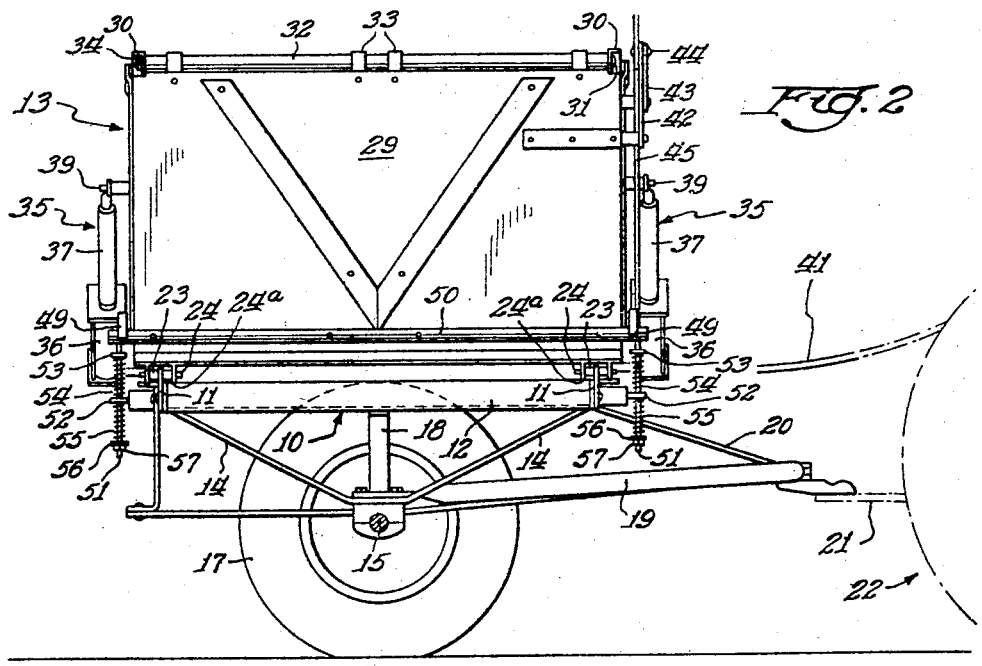
Figure 2 is a side elevation of the structure shown in Figure 1.

It will be noted particularly well in Figures 1 and 2 that front and rear frame bars 11 which curve upwardly at one end are provided with bearings 23 carrying pivot pins 24 received in lugs 24ª carried by the dump body. Pivot pins 24 serve for the pivotal mounting of the dump body 13 upon the rectangular frame 10, whereby the dump body may be swung upwardly and outwardly about an axis represented by the pivot pins 24.

The dump body is a rectangular receptacle corresponding to the shape of the frame 10 and is provided with a bottom 25, front and rear walls 26 and 27, and side or end walls 28 and 29. End wall 29 functions as a gate adapted to be opened when the body 13 is moved into dumping position in order to release and discharge the material accumulated therein.

The gate 29 is pivotally connected to the upper end of the dump body 13 by mechanism including a pair of lugs 30, one projecting laterally from the upper end of each of the side walls 26 and 27. Each lug is apertured to receive an elongated bolt 31 upon which is mounted a sleeve member 32 to which the upper edge of the gate 29 is secured by collars 33. The bolt 31 is held in place by a nut 34 at one end thereof. At this point, it will be clear that the dump body 13 is pivotable about one end thereof and that the end gate 29 swings away from the body to permit discharge of material therefrom.

The dump body 13 is swung upwardly and outwardly about the pivots 24 by hydraulic mechanism including a pair of hydraulic power units 35 at opposite sides of the receptacle. These hydraulic units are substantial duplicates, are similarly connected between the frame 10 and the dump body 13, and a description of one will suffice for both. Each unit 35 comprises a cylinder 36 and a piston 37. The cylinder is anchored at one end thereof upon a pivot pin 38 on the frame 10, while the piston is anchored upon a pin 39 secured to a reinforcing strap 40 affixed to the side of the receptacle. In the drawings, each of the units 35 is illustrated as a single acting hydraulic cylinder and piston unit and fluid is supplied simultaneously to both units under pressure through a pipeline 41 preferably from a source of power on the tractor 22. At this point it will be clear that the dump body 10 is moved into dumping position, as indicated in dotted lines in Figure 1, by the introduction of fluid under pressure into the cylinder 36 to extend the piston 37, and while the receptacle is moved into dumping position, the end gate 29 is swung outwardly in the manner shown in the drawing.

The swinging of the gate 29 outwardly to release the material to be discharged from the receptacle is controlled by a mechanism including a pair of links 42 and 43 pivoted upon a pin 44 in the manner of a toggle. Link 42 is pivotally connected to the gate 29 and the link 43 is pivotally connected to the side wall 26. Likewise connected to the links 42 and 43 is a rod or link 45 having a slot 46 in one end thereof to receive the pin 44 for sliding movement therein. The other end of the rod 45 is connected to one end of a lever 47 pivotally mounted at 48 upon the front wall 26 and provided at its other end with a latch 49 adapted to engage the projecting end of a pipe 50 secured to the lower edge of the gate. To the end of lever 47 adjacent the link 45 is pivotally attached a rod 51 which is slidably received in an eye-bolt 52 secured to the front frame bar 11 of the frame 10. A collar 53 is provided on the rod 51 near the upper end thereof and a spring 54 is confined between the collar and the eye-bolt 52. Below the eye-bolt 52 another spring 55 surrounds the rod 51 and abuts the eye-bolt 52 at its upper end and against a collar 56 at its lower end secured in place by a nut 57. These springs serve to hold the latch in place against the pipe 50 to lock the gate 29 prior to dumping the body 13 and a similar latch assembly is preferably provided at each end of the gate.

Upon actuation of the hydraulic units 35 to extend the piston 37 and dump the body 13, the rod 51 with its associated springs 54 and 55 connected to the frame 10 causes the lever 47 to pivot about its axis 48 as the dump body swings about its pivot 24. The toggle links 42 and 43 move away from the frame structure 10 to the piston indicated in dotted lines in Figure 1, the rod 45 moving into the dotted line position indicated, while rod 51 swings about its pivotal connection to the frame 10 as the dump body moves into dumping position. It will be noted that at the beginning of the dumping operation, as the links 42 and 43 move with respect to the rod 45, the pin 44 slides in the slot 46 so that during the initial dumping operation the position of the links is not affected. However, the lever 47 is caused to pivot about its axis 48 in the initial stage of dumping and the latch 49 is released from its engagement with the pipe 50. As soon as the lost motion in the slot 46 is taken up and pin 44 abuts the upper end of the slot, the links 42 and 43 move into a position substantially in alinement with pin 44, slightly over center, and with link 43 engaging a stop in the form of pin 58, seated in the receptacle wall 26 as shown in dotted lines in Figure 1. Upon return of the dump body to its normal position, the pipe 50 at the bottom of the gate 29 engages and rocks the latch 59 to return the end gate to its locked position.

It is believed that the operation of the dump cart of the present invention will be clear from the foregoing description. It may be understood that while the invention has been described in its preferred embodiment, modifications may be made therein without departing from the spirit of the invention or the scope of the appended claims.

What is claimed is:

1. A dump cart comprising a wheeled frame, a dump body carried on the frame, a pivoted gate on the body, pivot means connecting the body to the frame for movement thereof to and from dumping position, toggle links pivotally connected to the gate and to the body and actuable to open said gate, latch means for retaining the gate in closed position, link means connecting said latch and said toggle links at the juncture thereof, and resilient means connecting said links to the frame and operative upon movement of the dump body to dumping position to release said latch and actuate said toggle links.

2. A dump cart comprising a wheeled frame, a dump body carried on the frame, a pivoted gate on the body, pivot means connecting the body to the frame for movement thereof to and from dumping position, toggle links pivotally connected to the gate and to the body and actuable to open said gate, yieldable link means between the frame and the juncture of said toggle links and operative upon movement of said body to dumping position to swing the gate between closed and open positions, latch means pivoted on the body engageable with the gate to retain the latter in closed position, connecting means between the latch and said yieldable link for operating said latch, and lost motion means in the connection of said yieldable link to said toggle links accommodating release of said latch means prior to actuation of said toggle links.

3. A dump cart for attachment to a tractive vehicle having power transmission mechanism thereon, comprising a wheeled frame, a dump body carried on the frame, a pivoted gate on the body, pivot means connecting the body to the frame, a hydraulic cylinder and piston unit anchored to the frame and the dump body and receiving fluid under pressure from the vehicle for swinging the body about its pivot, a separate connection between the frame and the gate comprising toggle links attached to said gate and to said dump body, connecting means between the frame and the juncture of said toggle links and operable in response to the dumping of said body for actuating the toggle links to open said gate, and lost motion means in said last mentioned connecting means accommodating swinging of the dump body about its pivot in a certain range prior to actuation of said toggle links.

JOHN W. ORENDORFF.

REFERENCES CITED

The following references are of record in the file of this patent:

UNITED STATES PATENTS

| Number | Name | Date |
|---|---|---|
| 884,091 | Johnson | Apr. 7, 1908 |
| 2,213,385 | Dailey | Sept. 3, 1940 |
| 2,410,046 | Burns | Oct. 29, 1946 |

FOREIGN PATENTS

| Number | Country | Date |
|---|---|---|
| 12,198 | Great Britain | 1908 |